United States Patent
Chang et al.

(10) Patent No.: US 7,157,688 B2
(45) Date of Patent: Jan. 2, 2007

(54) PROJECTION SYSTEM AND OPTICAL PATH TRANSFER DEVICE THEREOF

(75) Inventors: Sean Chang, Taoyuan Hsien (TW); Albert Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 229 days.

(21) Appl. No.: 10/901,118

(22) Filed: Jul. 29, 2004

(65) Prior Publication Data

US 2005/0023446 A1  Feb. 3, 2005

(30) Foreign Application Priority Data

Jul. 31, 2003   (TW) ............................... 92121044 A

(51) Int. Cl.
*H01J 3/14* (2006.01)

(52) U.S. Cl. .................................. 250/216; 250/227.11

(58) Field of Classification Search ................ 250/216, 250/226, 225, 235, 227.11
See application file for complete search history.

(56) References Cited

U.S. PATENT DOCUMENTS 4,931,830 A * 6/1990 Suwa et al. .................... 355/71

* cited by examiner

*Primary Examiner*—Que T. Le
(74) *Attorney, Agent, or Firm*—Birch, Stewart, Kolasch & Birch, LLP

(57) ABSTRACT

A projection system. The projection system has a light source, a relay module, an optical path switching device and an optical path transfer device. The light source emits a light beam, and the relay module relays the light beam. The optical path switching device is used to receive and switch the light beam and has at least one active area. The optical path transfer device is disposed between the relay module and the optical path switching device directing the light beam toward the optical path switching device in a first angle, and the optical path transfer device has an incident surface tilted perpendicular to an incidence of the light beam.

13 Claims, 7 Drawing Sheets

PROJECTION SYSTEM AND OPTICAL PATH TRANSFER DEVICE THEREOF

This Non-provisional application claims priority under 35 U.S.C. § 119(a) on Patent Application No(s). 092121044 filed in Taiwan, Republic of China on Jul. 31, 2004, the entire contents of which are hereby incorporated by reference.

BACKGROUND OF THE INVENTION

1. Field of the Invention

The present invention relates to a projection system and an optical path transfer device thereof, and particularly to a projection system and an optical path transfer device thereof with high illumination efficiency.

2. Description of the Related Art

In a conventional optical projection display, a light beam emitted from a light source is projected toward a digital micromirror device (DMD). The DMD is formed with a plurality of micromirrors selectively disposed in one of two predetermined tilt angles, in which the light beam is guided and reformed for projection as an image onto the display screen. Thus, each of the pixels on the display can be selectively switched to either a bright mode, in which the light beam passes through the projection system, or a dark mode, in which the light beam does not pass through the projection system.

FIG. 1 illustrates a conventional projection system 100. FIG. 2A is a partial perspective view of the total internal reflection prism (TIR prism) 112 and the DMD 114 in FIG. 1. Further, a side view of the X-Y plane in FIG. 2A is shown in FIG. 2B, and a top view of the X-Z plane in FIG. 2A is shown in FIG. 2C.

The optical path of the projection system 100 is described hereinafter with reference to FIG. 1. The light beam I, emitted from the light source 102 and condensed by the reflector 104, passes through the color wheel 106, the light tunnel 108, the relay lens 110 and the total internal reflection prism (TIR prism) 112, and is projected toward the DMD 114. With the switching of the DMD 114, the light beam I corresponding to the image signal passes through the projection lens 116 and is projected toward the display device 118 to display the image.

Generally, the projection lens 116 and the DMD 114 are disposed in an on-axis configuration. Specifically, the light beam I is directed toward the projection lens 116 along a direction substantially parallel to the light axis of the projection lens 116. Accordingly, the light beam I reflected by the TIR prism 112 is projected toward the DMD 114 at a tilt angle θ. That is, the light beam I is projected toward the DMD 114 in an off-axis manner with the tilt angle θ.

Configuration of the optical path can be further described in detail with reference to FIG. 2A to FIG. 2C. In FIG. 2A, the light beam I is projected perpendicularly toward the TIR prism 112 on the incident surface 120 and is reflected toward the DMD 114 in the off-axis manner. In view of the X-Y plane as shown in FIG. 2B, the light beam I is incident on the DMD 114 at a tilt angle θ.

Further, in view of the X-Z plane as shown in FIG. 2C, the light beam I in the TIR prism 112 is directed in a direction parallel to two side surfaces 122 of the TIR prism 112.

Since the light beam I from the TIR prism 112 is incident on the DMD 114 at the tilt angle θ, an illumination area 126 of the light beam I on the DMD 114 is stretched and deformed as a parallelogram. However, the illumination area 126 may exceed the active area 206, generally in a rectangular shape, of the DMD 114. Accordingly, luminosity waste occurs in the DMD 114, which reduces the illumination efficiency of the projection system 100.

SUMMARY OF THE INVENTION

Accordingly, an object of the present invention is to provide a projection system, in which the illumination area of the light beam projected toward the optical path switching device is fully enclosed by the active area thereof. Thus, the illumination efficiency can be effectively enhanced.

The present invention discloses a projection system. The projection system comprises a light source, a relay module, an optical path switching device and an optical path transfer device. The light source emits a light beam, relayed by the relay module. The optical path switching device receives and switches the light beam and comprises at least one active area. The optical path transfer device is disposed between the relay module and the optical path switching device, directing the light beam toward the optical path switching device with a first angle, and the optical path transfer device has an incident surface tilted in a direction perpendicular to an incident direction of the light beam.

Further, the present invention discloses an optical path transfer device for projecting a light beam toward a light receiving device. The optical path transfer device has at least two parts and at least one air gap. Each part transfers the light beam and has an incident surface. The air gap is disposed between the at least two parts. Further, the incident surface tilts perpendicular to the incidence of the light beam.

In the present invention, the light receiving device comprises an optical path switching device receiving or switching the light beam. The optical path switching device can be a digital micromirror device (DMD) or liquid crystal on silicon (LCoS). Further, the light beam is incident perpendicularly toward the incident surface, the incident surface forms a second angle with a normal of each side surface of the optical path transfer device, variable corresponding to the first angle.

The projection system of the present invention may further comprise a reflector for focusing the light beam, a color wheel for changing the color of the light beam, a light tunnel for uniformly merging the light beam, a display device for displaying image signals of the light beam from the optical path switching device, or a projection lens disposed between the optical path switching device and the displaying device for projecting the light beam. Further, the relay module may comprise at least one lens to adjust focus and projection distance of the light beam. Further, the optical path transfer device can be a total internal reflection prism (TIR prism) or a reversed total internal reflection prism (reversed TIR prism).

In the present invention, an illumination area of the light beam projected on the optical path switching device from the optical path transfer device correlates in size and shape to the active area.

With the tilt incident surface of the optical path transfer device in the present invention, deformation of the illumination area due to off-axis incidence in the conventional projection system can be eliminated. Accordingly, the illumination area fully overlaps the active area of the optical path switching device, i.e. the entire light beam is projected on the active area. Thus, illumination efficiency is significantly enhanced.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings which are given by way of illustration only, and thus are not limitation of the present invention, and wherein.

DETAILED DESCRIPTION OF THE INVENTION

Figure 4A:
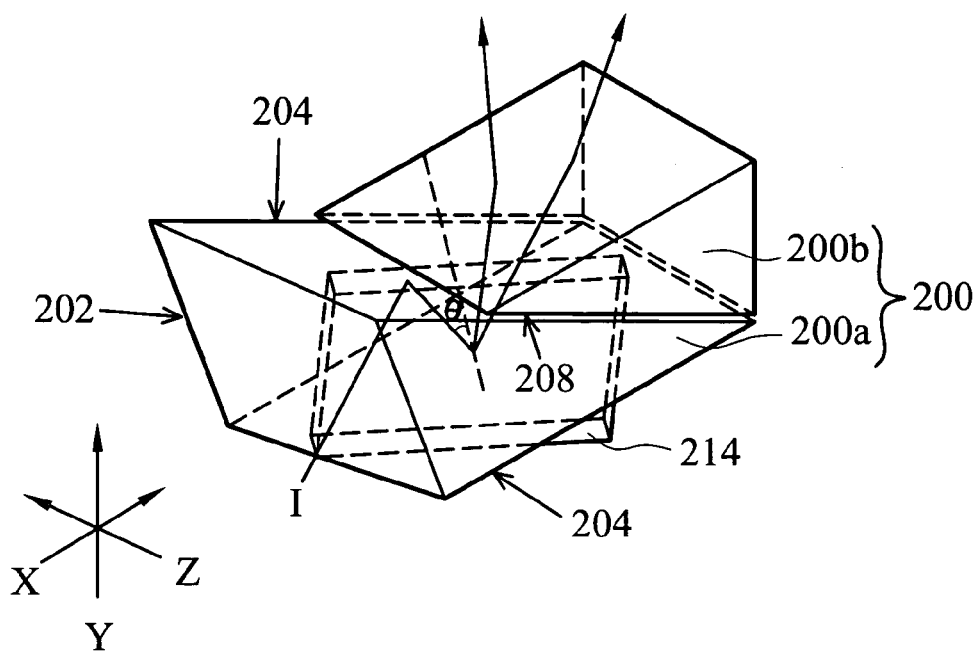
FIG. 4A is a perspective view of one embodiment of the optical path transfer device of the present invention.
Figure 4B:
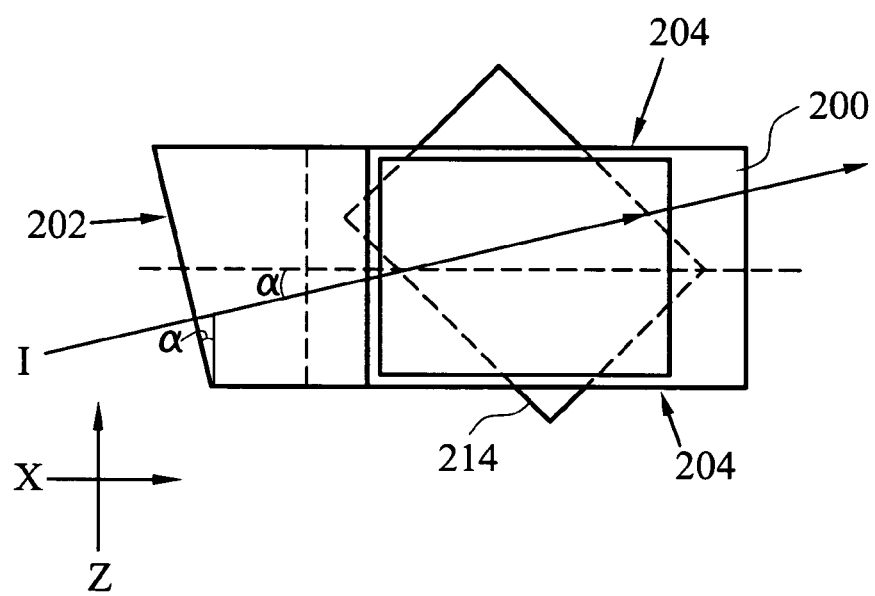
FIG. 4B is a top view of the X-Z plane in FIG. 4A.

FIG. 4A is a perspective view of an embodiment of the optical path transfer device 200 of the present invention. A top view of the X-Z plane in FIG. 4A is shown in FIG. 4B. Referring to both FIGS. 4A and 4B, the optical path transfer device 200 includes at least two parts 200a and 200b, and an air gap 208 disposed between these two parts 200a, 200b. The incident surface 202 of the first part 200a tilts perpendicular to the incidence of the light beam I, and an angle α is formed between the normal of the incident surface 202 and the normal of the two side surfaces 204. The optical path transfer device 200 alters the light beam in a direction different from the incident direction thereof.

The optical path transfer device 200 can be a total internal reflection prism (TIR prism) or a reversed total internal reflection prism (reversed TIR prism). The first and second parts 200a and 200b can be prisms, made of glass or any other photoconductive material with a refractive index larger than 1.

The refractive indices of the first and second parts 200a, 200b are significantly larger than that of the air gap 208. Accordingly, when the light beam I passes through the interface between the first and second parts 200a, 200b, total internal reflection occurs due to the difference between the refractive index and the incident is angle, and the light beam I is projected toward the optical path switching device 214.

Further referring to FIGS. 4A and 4B, the light beam I is projected toward the optical path transfer device 200 on the incident surface 202, and toward the optical path switching device 214 in the off-axis manner.

In view of the X-Y plane, the light beam I is projected perpendicularly toward the incident surface 202, and toward the optical path switching device 214 at a tilt angle θ (i.e. the angle between the light beam I and the normal of the optical path switching device 214). Further, in view of the X-Z plane as shown in FIG. 4B, the light beam I incident toward the optical path transfer device 200 forms an angle α with each side surface 204 of the optical path transfer device 200, and is directed through the optical path transfer device 200 at the same angle toward the projection lens 116 referred to in FIG. 1.

Figure 5:
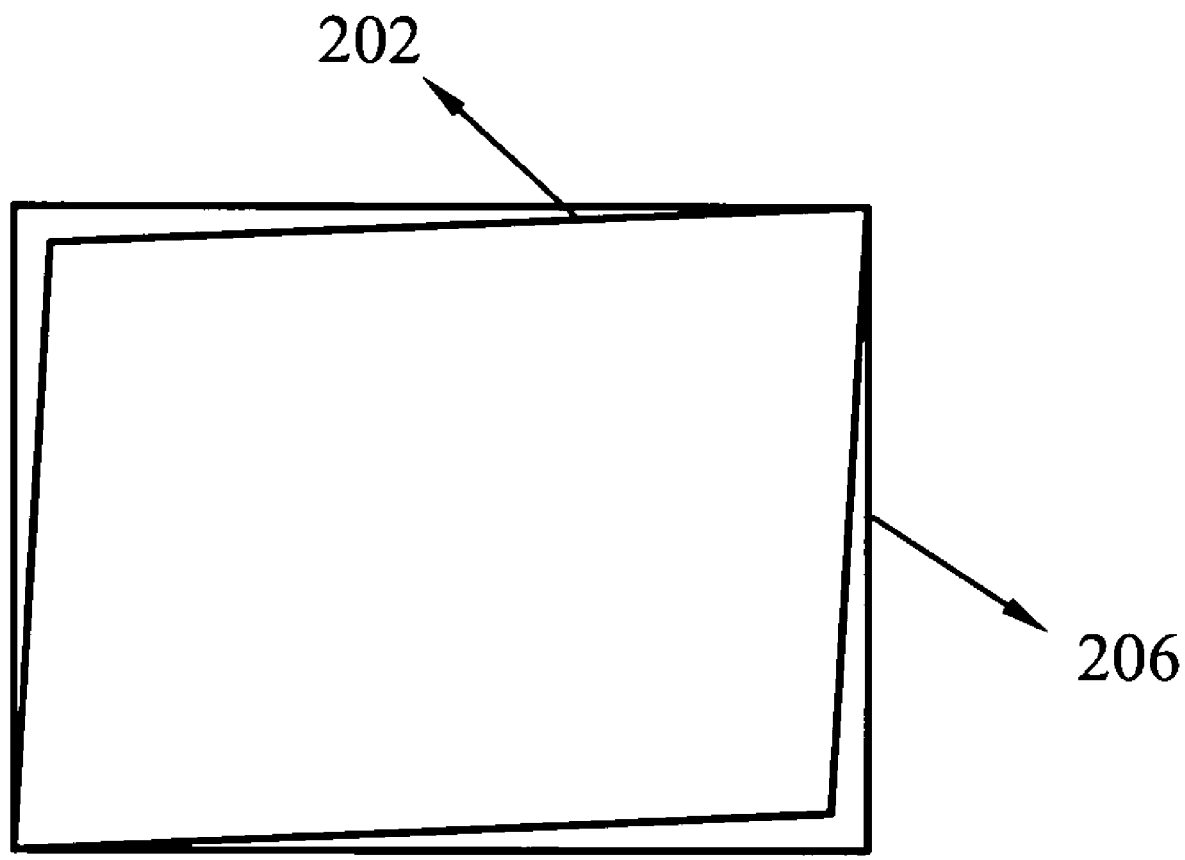
FIG. 5 is a schematic diagram of an illumination area of the light beam passing through the optical path transfer device and incident on the DMD according to the present invention.

FIG. 5 is a schematic view of an illumination area 206 of the light beam I passing through the optical path transfer device 200 of the present invention. The light beam I from the optical path transfer device 200 is projected toward the optical path switching device 214 at the tilt angle θ, such that the illumination area of the light beam I on the optical path switching device 214 is stretched and deformed. However, the incident surface 202 of the optical path transfer device 200 is set to tilt at the angle α, such that the deformed illumination area is pre-stretched to correspond to the final illumination area 206 on the optical path switching device 214, substantially assuming a rectangular shape, correlating in size and shape to the rectangular active area 206 of the optical path switching device 214. Thus, luminosity waste is reduced, and the illumination efficiency of the projection system 200 is significantly enhanced.

Figure 1:
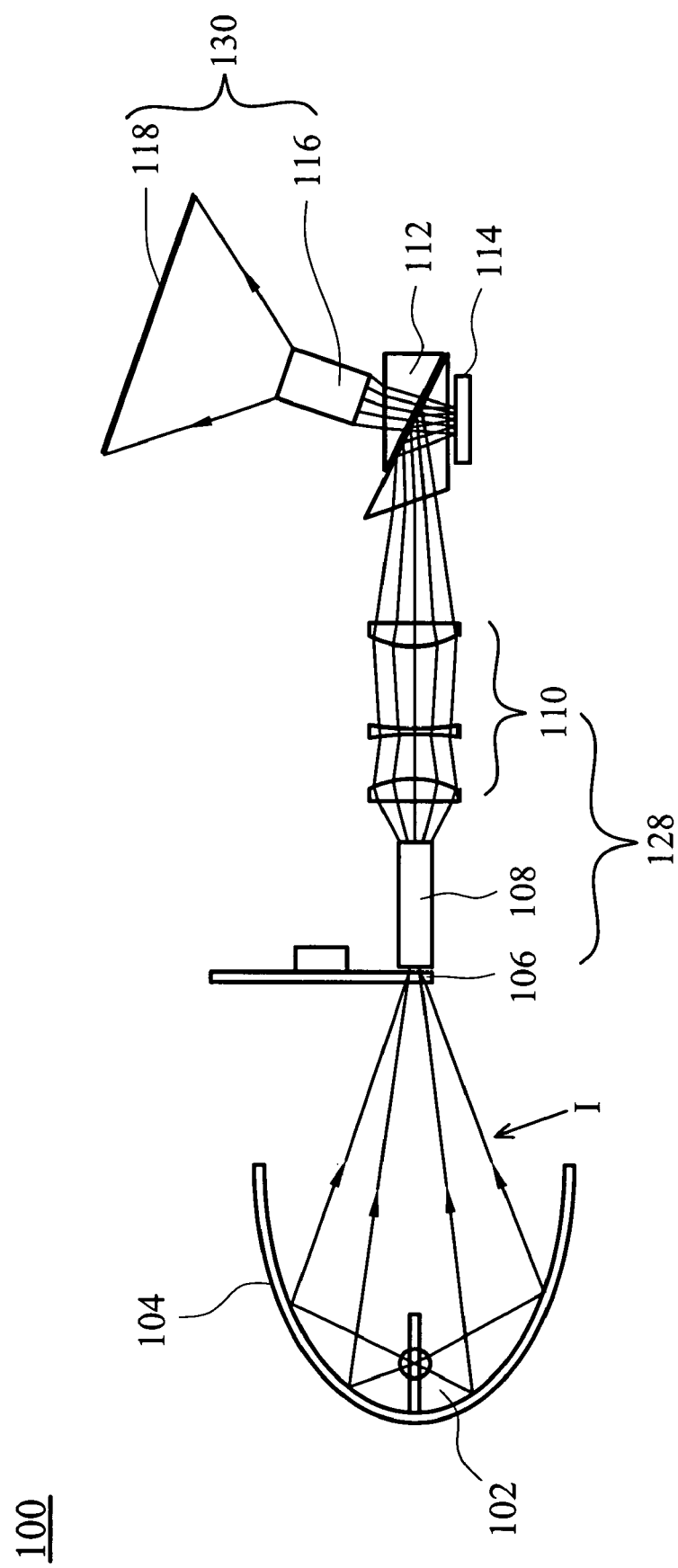
FIG. 1 is a schematic diagram of a conventional projection system.
Figure 2A:
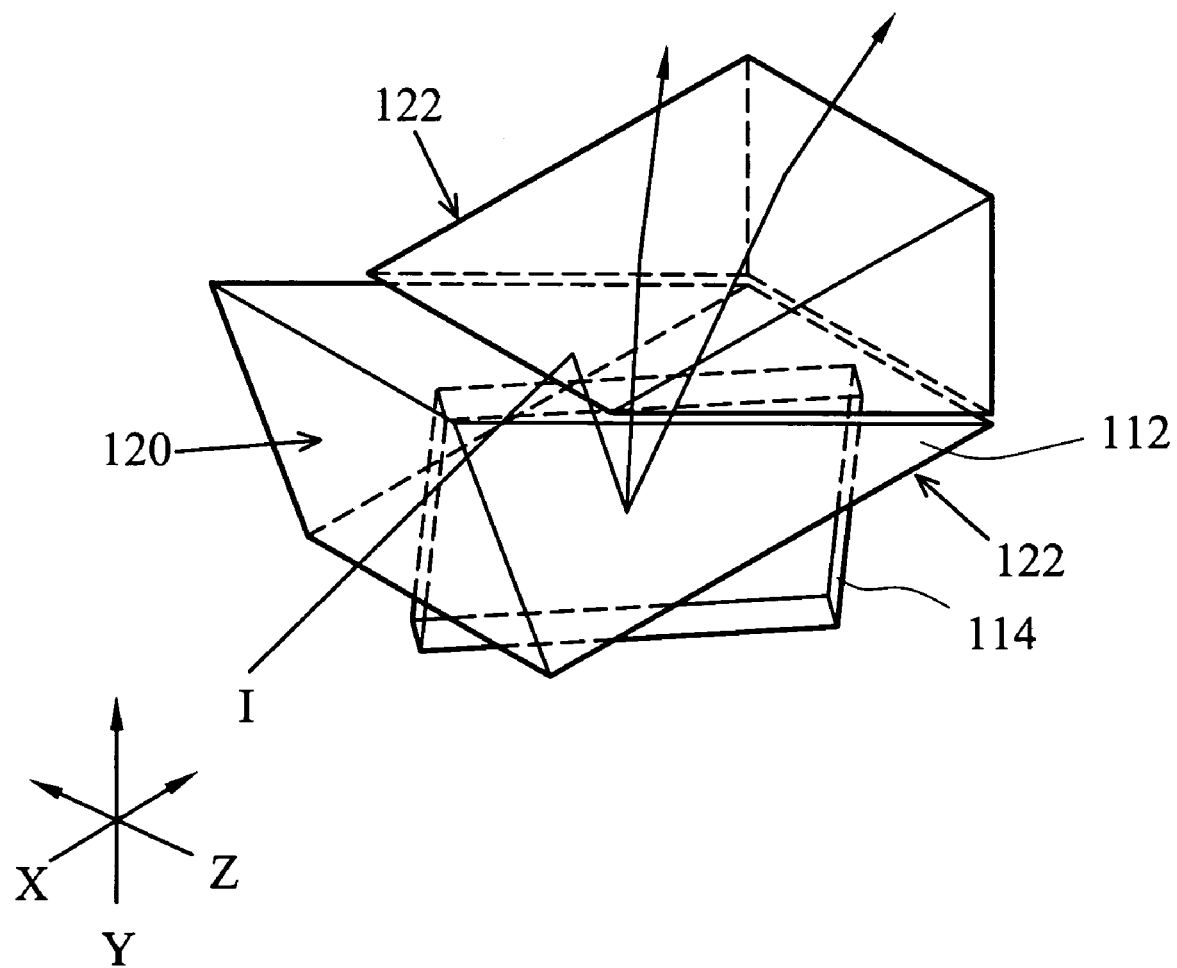
FIG. 2A is a partial perspective view of the TIR prism and the DMD of FIG. 1.
Figure 2B:
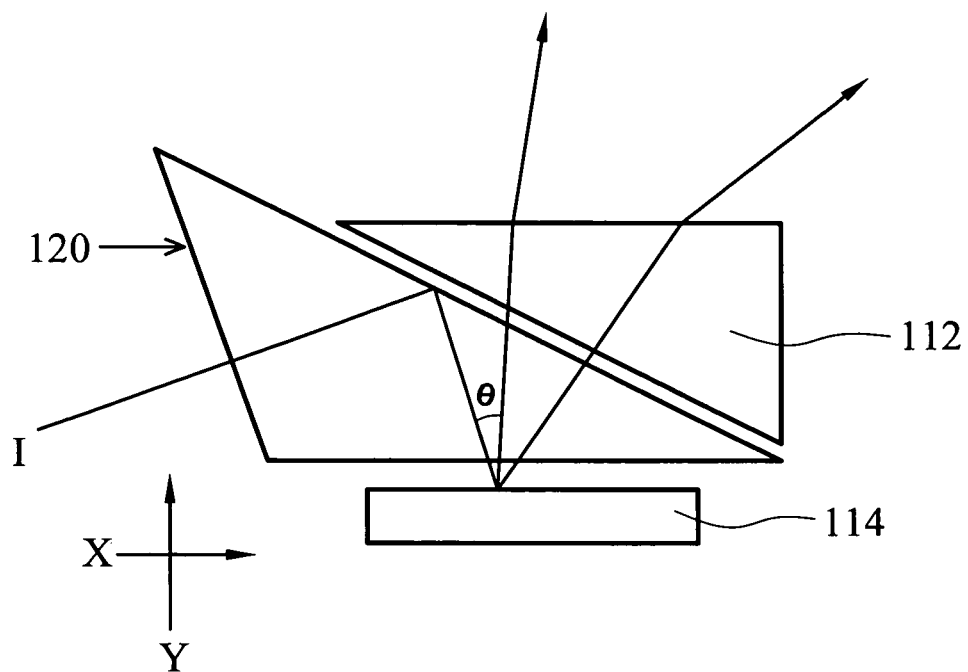
FIG. 2B is a side view of the X-Y plane in FIG. 2A.
Figure 2C:
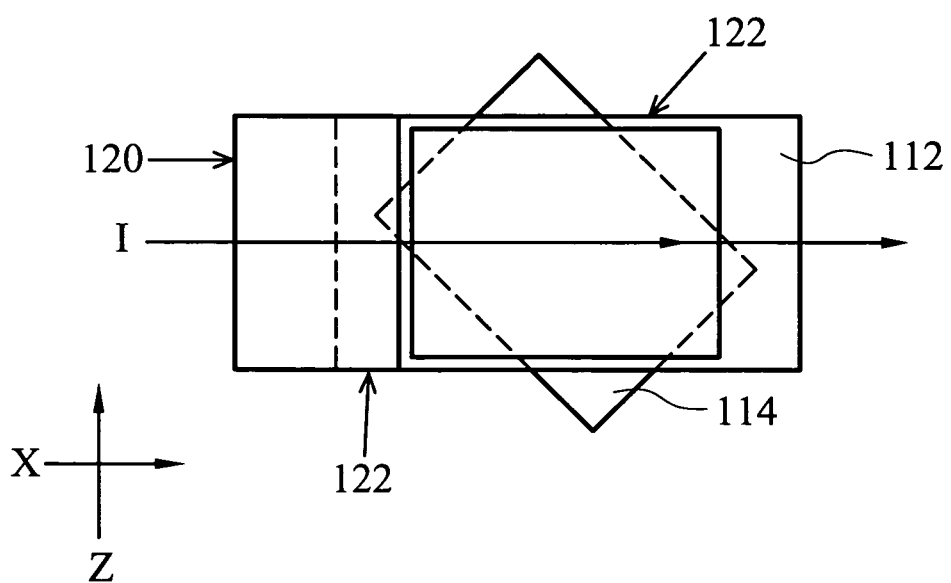
FIG. 2C is a top view of the X-Z plane in FIG. 2A.
Figure 3:
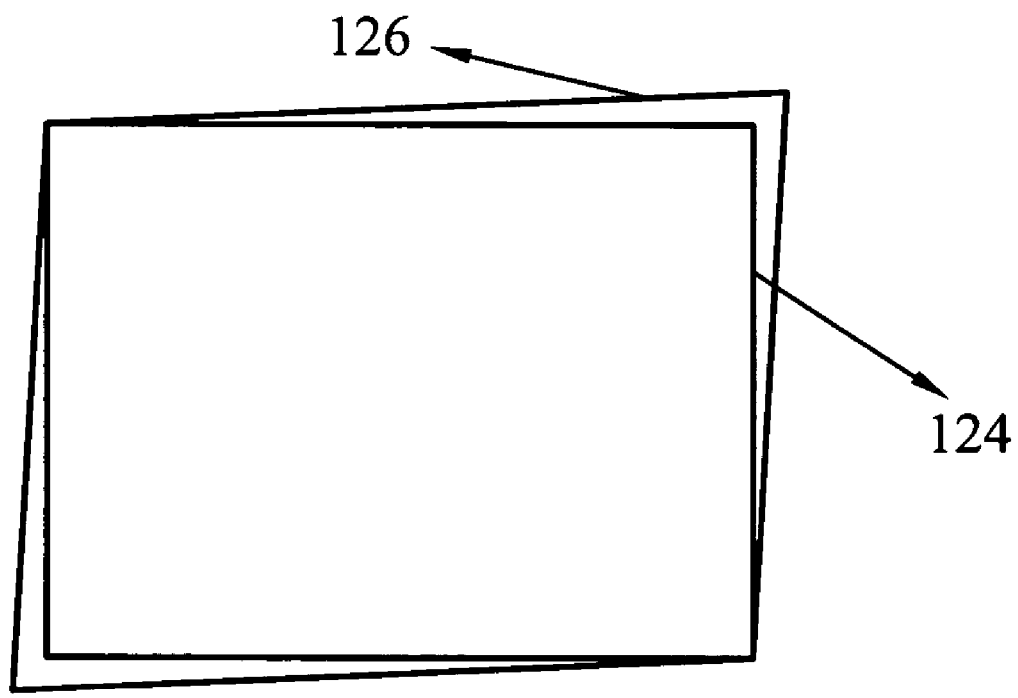
FIG. 3 is a schematic diagram of an illumination area of the light beam passing through the conventional TIR prism and incident on the DMD.

Referring to FIG. 1 and FIG. 4A, the TIR prism 112 in FIG. 1 is replaced by the optical path transfer device 200 of the present invention in FIG. 4A. The projection system 100 of the present invention has a light source 102, a relay module 128, the optical path switching device 214, the optical path transfer device 200, and a display module 130. The incident surface 202 of the optical path transfer device 200 forms an angle α with the normal of the side surfaces 204.

The light source 102, which can be in the form of a point or a line, emits a light beam I for the projection system 100. Further, a reflector 104 can be provided for focusing the light beam I to focus onto the relay module 128.

The relay module 128 is disposed between the light source 102 and the optical path transfer device 200 to relay and change the projection distance of the light beam I. The relay module 128 can include a color wheel 106 changing color of the light beam I, a light tunnel 108 uniformly merging the light beam I, and a relay lens 110. The color wheel 106 also can be replaced by a polarizing plate.

The light tunnel 108 receives light beam I from the light source 102 for merging. The peripheral walls of the light tunnel 108 include reflective surfaces.

The relay lens 110 relays and adjusts the focus and projection distance of the light beam I. Generally, the relay lens 110 includes a plurality of lenses of either the same or different type.

The optical path transfer device 200 is disposed between the relay module 128 and the optical path switching device 214, directing light beam I toward the optical path switching device 214. The structure of the optical path transfer device 200 is described in detail in the above paragraph.

The optical path switching device 214 has a plurality of optical path switching elements (not shown) to respectively control the direction of the light beam I. The optical path switching device can be a digital micromirror device (DMD), a liquid crystal on silicon (LCoS), or any other light-receiving device. Further, an angle is formed between the light beam I and the normal of the optical path switching device 214, including the above-mentioned off-axis projection angle θ.

The projection module 130 receives the light beam I from the optical path switching device 214 and forms the image signal of the light beam I. The projection module 130 can include a projection lens 116 and a display device 118.

The projection lens 116 relays and adjusts the focus and the projection distance of the light beam I. The projection lenses 116 can include a plurality of lens of either the same or different type.

The display device 118 displays the image signals of the light beam I from the optical path switching device 214. The display device 118 can be an LCD screen, a projection screen, or any other type of display.

In the projection system 100, the light beam I emitted from the light source 102 passes through the optical path transfer device 200 at a tilt angle θ. Further, the incident surface 202 and the optical path transfer device 200 form an angle α. Thus, the illumination area 206 on the optical path switching device 214 is altered to substantially in a rectangular, corresponding in size and shape to the rectangular active area of the optical path switching device 214. Thus, luminosity waste is reduced, and the illumination efficiency of the projection system 200 is significantly enhanced.

It should be mentioned that the optical path transfer device of the embodiment includes, in its simplest form, two prisms and an air gap, but additional elements can also be selected and used. An embodiment of a reversed optical path transfer device 300 is shown in FIG. 6A.

Figure 6A:
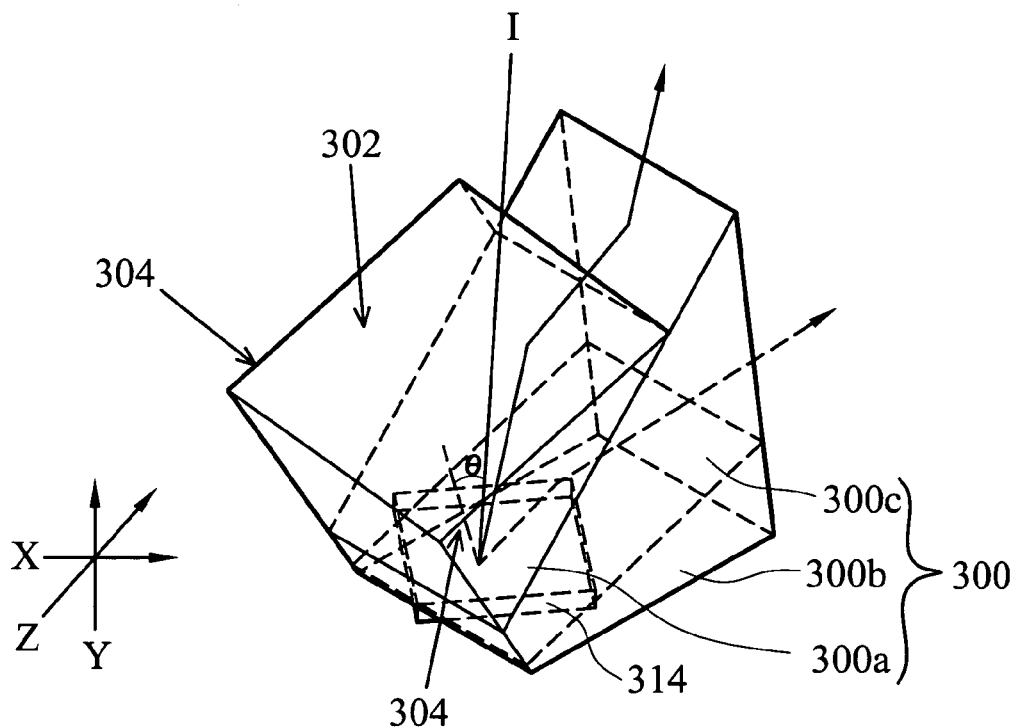
FIG. 6A is a perspective view of another embodiment of the optical path transfer device of the present invention.
Figure 6B:
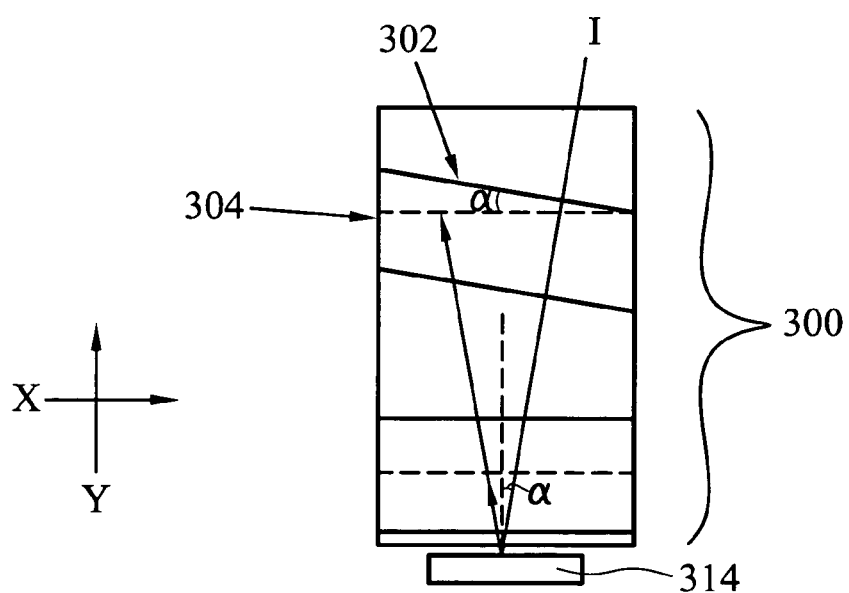
FIG. 6B is a side view of the X-Y plane in FIG. 6A.

Referring to FIGS. 6A and 6B, the reversed optical path transfer device 300 has three parts 300a, 300b and 300c. An angle α is formed between the incident surface 302 of the first part 300a and the normal of the two side surfaces 304. Thus, the light beam I passes through the incident surface 302 at the tilt angle α and is projected on the optical path switching device 314 at the angle θ to form the illumination area corresponding in size and is shape to the active area of the optical path switching device 314.

A further embodiment is applied to the optical path transfer device of the present invention. Referring to FIGS. 4A and 4B, when the first angle θ is set to 22° to 24°, the second angle α between the incident surface 202 and the normal of the side surfaces 204 is about 8°. Thus, the illumination area 206 of the light beam I projected on the optical path switching device 314 correlates in size and shape (or even overlaps) to the active area of the optical path switching device 214.

The first angle θ can be variable corresponding to the second angle α. Thus, luminosity waste is reduced, and the illumination efficiency of the projection system 100 is significantly enhanced.

With the tilt incident surface of the optical path transfer device in the present invention, deformation of the illumination area due to off-axis incidence in the conventional projection system is eliminated. Accordingly, the illumination area fully overlaps the active area of the optical path switching device, i.e. the entire light beam is projected on the active area. Thus, the illumination efficiency is significantly enhanced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projection system, comprising:
   a light source emitting a light beam;
   a relay module relaying the light beam;
   an optical path switching device receiving and switching the light beam, the optical path switching device comprising at least one active area; and
   an optical path transfer device disposed between the relay module and the optical path switching device directing the light beam toward the optical path switching device at a first angle, the optical path transfer device comprising an incident surface tilted at a direction perpendicular to the incidence of the light beam.

2. The projection system as claimed in claim 1, wherein the light beam is incident perpendicularly toward the incident surface.

3. The projection system as claimed in claim 1, wherein the incident surface forms a second angle with the normal of each side surface of the optical path transfer device.

4. The projection system as claimed in claim 3, wherein the second angle varies corresponding to the first angle.

5. The projection system as claimed in claim 1, further comprising a reflector for focusing the light beam.

6. The projection system as claimed in claim 1, wherein the relay module further comprises a color wheel or a polarizing plate for changing the color of the light beam.

7. The projection system as claimed in claim 1, wherein the relay module further comprises a light tunnel uniformly integrating the light beam.

8. The projection system as claimed in claim 1, wherein the relay module further comprises at least one lens to adjust a focus and a projection distance of the light beam.

9. The projection system as claimed in claim 1, further comprising a display device displaying image signals of the light beam from the optical path switching device.

10. The projection system as claimed in claim 9, further comprising a projection lens disposed between the optical path switching device and the displaying device for projecting the light beam.

11. The projection system as claimed in claim 1, wherein the optical path transfer device is a total internal reflection prism (TIR prism) or a reversed total internal reflection prism (reversed TIR prism).

12. The projection system as claimed in claim 1, wherein an illumination area of the light beam projected on the optical path switching device from the optical path transfer device is similar to the active area in size and shape.

13. The projection system as claimed in claim 1, wherein the optical path switching device comprises a digital micromirror device (DMD) or a liquid crystal on silicon (LCoS).

* * * * *